United States Patent
Henrio et al.

(10) Patent No.: US 6,437,731 B1
(45) Date of Patent: Aug. 20, 2002

(54) METHOD AND DEVICE FOR THE ALIGNMENT OF AN AUTOMOBILE RADAR

(75) Inventors: Jean-François Henrio, Brest; Jean-Paul Artis, Plouzane, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/656,271

(22) Filed: Sep. 6, 2000

(30) Foreign Application Priority Data

Sep. 7, 1999 (FR) .......................................... 99 11182

(51) Int. Cl.$^7$ ................................................. G01S 7/40
(52) U.S. Cl. ........................ 342/165; 342/173; 342/174
(58) Field of Search ................................ 342/165, 173, 342/174, 175

(56) References Cited

U.S. PATENT DOCUMENTS

| | | | |
|---|---|---|---|
| 3,836,929 A | * 9/1974 | White | 342/427 |
| 4,707,698 A | * 11/1987 | Constant | 342/179 |
| 5,208,561 A | 5/1993 | Delestre et al. | 333/22 R |
| 5,923,284 A | 7/1999 | Artis et al. | 342/129 |
| 5,945,942 A | 8/1999 | Artis et al. | 342/165 |
| 6,023,238 A | 2/2000 | Cornic et al. | 342/129 |
| 6,211,813 B1 | 4/2001 | Dousset et al. | 342/153 |

FOREIGN PATENT DOCUMENTS

| | | |
|---|---|---|
| DE | 196 42 811 | 4/1998 |
| DE | 197 07 590 | 9/1998 |
| EP | 0 905 526 | 3/1999 |
| EP | 0 936 472 | 8/1999 |
| GB | 2 334 842 | 9/1999 |
| JP | 11148973 A | * 6/1999 |

* cited by examiner

Primary Examiner—John B. Sotomayor
(74) Attorney, Agent, or Firm—Oblon, Spivak, McClelland, Maier & Neustadt, P.C.

(57) ABSTRACT

The disclosure relates to methods and devices for adjusting and setting the alignment of the radio axis of a radar installed on a vehicle with respect to a determined direction. The method, in making use of an adjustment and setting stand comprising a goniometer-responder, consists: in acquiring the angles $\alpha$ and $\beta$, $\alpha$ a being the azimuthal angle at which the radar perceives the goniometer-responder and $\beta$ being the angle between the determined direction and the axis of the stand; determining the azimuth $\gamma$ of the radar by means of the goniometer-responder when the radar, configured in test mode, sends out a continuous frequency; equalizing the azimuth $\gamma$ with the angle $\beta$ by translating the goniometer-responder along its axis of motion; nullifying the angle of azimuth $\alpha$ by actuating the means to adjust the radar in azimuth. The device includes a goniometer-responder used to locate the radar in azimuth and in elevation when the radar is in test mode and sends out a continuous frequency. Application: especially to the adjustment and setting of the alignment of the radio axis of a radar installed on a vehicle with respect to the thrust axis of the vehicle.

10 Claims, 5 Drawing Sheets

METHOD AND DEVICE FOR THE ALIGNMENT OF AN AUTOMOBILE RADAR

BACKGROUND OF THE INVENTION

1. Field of the Invention

The present invention relates to a method and device for adjusting and setting the alignment of a radar for automobiles, especially the alignment of the radio axis of the radar with respect to a determined direction relative to the vehicle. The method and the device can be applied especially to the alignment of the radio axis of the radar on the axis of thrust of the vehicle.

Several types of radars can be fitted into automobile vehicles. These include ACC or <<Automotive Cruise Control>> type radars. One radar of this type is used to regulate the pace of the vehicles. It detects and locates the closest vehicle that is in the path of the carrier. For this application, the radar requires, for example, a range of about 150 meters. In particular, it must be able to ascertain that a vehicle is located in the path of the carrier at this distance. Because there are sources of inaccuracy that play a role in the angular localization, the radio axis of the radar must be aligned azimuthally with the tangent to the trajectory of the carrier vehicle. The axis of thrust is the tangent to the trajectory followed by the vehicle when the conductor releases the steering wheel. For a vehicle that has no serious defects, especially as regards the geometry of the wheel assemblies or the quality of the tires, this path is a straight line or a curve with a wide radius of curvature. The axis of thrust is very substantially the bisectrix of the angle formed by the horizontal projection of the axes of the rear wheels. The radio axis is the axis along which the radar measures an angular variation of zero for an object located on this axis. The alignment must be measured to a precision of more than 0.20° approximately. This constitutes a very precise alignment. The operation of adjusting and setting this alignment consists in making the radio axis of the radar parallel to the axis of thrust of the carrier vehicle.

For reasons that take account of the aesthetic aspects of the vehicle, the radar is positioned behind a body element or it is concealed behind a cover. The body element or the cover is made of a material especially designed so that microwaves undergo little or no attenuation and deflection.

It should be possible to align the radar quickly and precisely on the assembly line. Just like the alignment of the headlights and the setting of the parallelism of the wheels, the alignment of the radar is part of the final operations for the manufacture of the vehicle. It should be possible to do the alignment simply and automatically. In particular, this operation should not call for any operation of disassembly.

2. Description of the Prior Art

To adjust and set the alignment, several adjusting and setting techniques are known. Certain techniques implement an optical or electro-optical device.

Such techniques require optical access to the radar, either to fit in a set of tools or to provide for a precise lateral localization of the radar with respect to the assembly used for the alignment. These constraints require that the alignment should be adjusted before the installation of the "aesthetic cover". This means that only an a priori correction can take account of an axial deviation, if any, caused by the aesthetic cover of the radar. Thus, this technique is not enough, by itself, for an adjusting and setting operation that fulfils the requirements of alignment. It requires an assessment of the axial deflection that may be introduced by the aesthetic cover. In addition, the aesthetic cover cannot be mounted until after the adjustment and setting of the alignment. If not, an operation to dismantle said cover must be done before the adjustment and setting operation. This constraint is not very compatible with vehicle assembly lines.

SUMMARY OF THE INVENTION

The invention is aimed especially at overcoming the above drawbacks. To this end, an object of the invention is a method for adjusting and setting the alignment of the radio axis of a radar installed on a vehicle parked on a running surface, with respect to a determined direction relative to the vehicle, by means of a adjustment and setting stand comprising a goniometer-responder assembled on an axis of motion perpendicular to the axis of the stand, wherein the method consists in:

acquiring the angles $\alpha$ and $\beta$, $\alpha$ being the azimuthal angle at which the radar perceives the goniometer-responder and $\beta$ being the angle between the determined direction and the axis of the stand, determining the azimuth $\gamma$ of the radar by means of the goniometer-responder when the radar, configured in test mode, sends out a continuous frequency, equalizing the azimuth $\gamma$ with the angle $\beta$ by translating the goniometer-responder along its axis of motion, nullifying the angle of azimuth $\alpha$ by actuating the means to adjust the radar in azimuth.

An object of the invention is also an adjustment and setting stand to implement the method, comprising:

a reference axis related to the running surface, a goniometer-responder, positioned with respect to the running surface and having a frequency band compatible with that of the radar, for the angular localization, by angular deflection, of the radar when the radar sends out a continuous frequency in a test mode, an interface and control device connected to the radar to configure the radar in test mode and acquire the azimuth a of the goniometer-responder measured by the radar.

The method especially enables the precise alignment of the radio axis of the radar with the axis of thrust of the carrier vehicle. The method does not require any disassembly. It can be automated. It can just as easily be implemented in an assembly line, after the final stage of assembly, and in a garage during maintenance work.

The device comprises a goniometer-responder for which the majority of the specifications can be deduced from the specifications of the radar. This characteristic makes it possible to manufacture the device according to the invention at very low cost. The device is compact. It can be integrated into a vehicle assembly line.

BRIEF DESCRIPTION OF THE DRAWINGS

Other characteristic and advantages of the invention shall appear from the following description. The description is made with reference to the appended drawings, of which:

FIG. 7 is a diagrammatic view of a goniometer-responder of the device of

FIG. 6.

MORE DETAILED DESCRIPTION

In the various figures, the homologous elements are given the same references.

Figure 1:
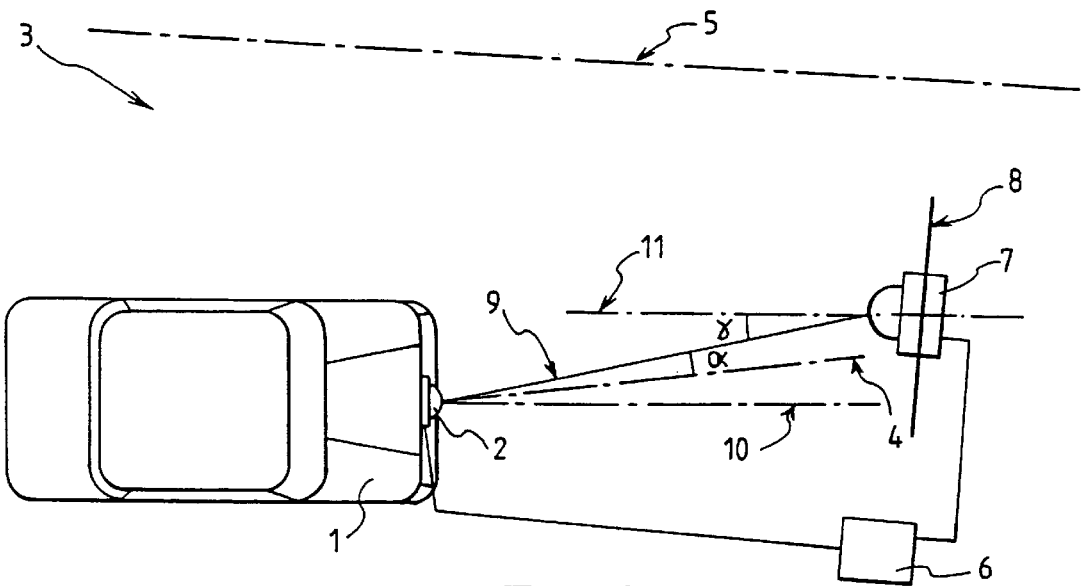
FIG. 1 is an illustration of the method according to the invention.

FIG. 1 illustrates the method of adjusting and setting the alignment of the radio axis of a radar installed on a vehicle.

The vehicle 1 equipped with the radar 2 is parked on a running surface 3. The running surface 3 is associated with an adjustment and setting stand for the alignment of the radio axis 4 of the radar 2. The radar 2 is equipped with means for azimuthal adjustment and preferably means for adjustment in elevation.

The adjustment and setting stand comprises a reference axis 5, an interface and control device 6 and a goniometer-responder 7. The adjustment stand is positioned in a given way with respect to the running surface 3. The interface and control device 6 is connected, firstly to the radar 2 to be aligned and secondly to the goniometer-responder 7. The goniometer-responder 7 may have an axis of motion 8 perpendicular to the reference axis 5 and preferably parallel to the running surface 3.

The angle α is the angle between, firstly the line of sight 9 from the radar 2 to the target (the goniometer-responder 7) and, secondly the radio axis 4 of the radar 2.

The angle β, not shown, is the angle between a determined direction 10 relating to the vehicle and the reference axis 5.

The azimuth γ is the angle between, firstly the line of sight 9 from the goniometer-responder 7 to the target (the radar) and, secondly the radio axis 11 of the goniometer-responder 7.

The method of the invention consists in aligning the radio axis 4 of the radar 2 with the determined direction 10.

Figure 2:
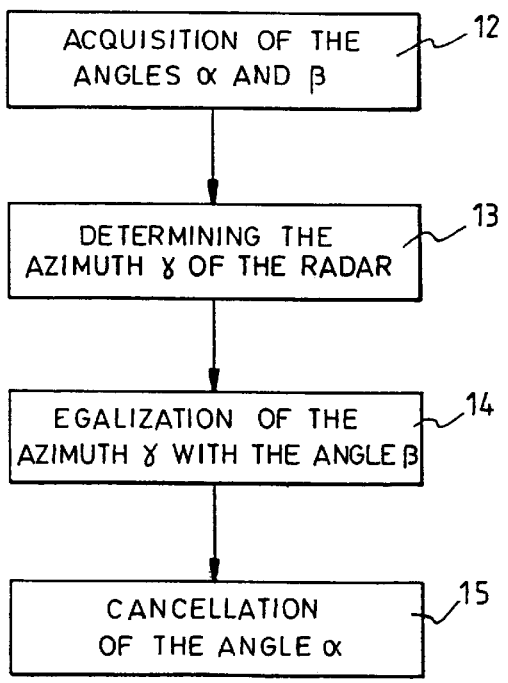
FIG. 2 shows the method in the form of a flow chart.

The steps of the method are given in the form of a flow chart in FIG. 2.

In a first mode of implementation of the method, the determined direction 10 coincides with the thrust axis of the vehicle 1. In this case, the angle β can be given by means of a wheel assembly adjusting and setting stand.

The method consists, in a first step, of the acquisition of the angle α and the angle β. The acquisition may be entirely automatic and carried out by means of the interface and control device. In this case the interface and control device has a link with the angle β measurement device to acquire the angle β automatically.

In a second step of the method, the azimuth γ of the radar is determined 13, preferably by means of the goniometer-responder. One method consists in configuring the radar in test mode, for example by means of the interface and control device. In this mode, the radar emits a frequency continuously. This enables the local oscillator of the goniometer-responder to get tuned according to the frequency sent out by the radar so that the difference between the frequencies of the radar and the goniometer-responder is in the band of the receivers of the radar and the goniometer-responder.

In a third step of the method, the azimuth γ is equalized 14 with the angle β. In one method, the goniometer-responder is translated along its axis of motion until the azimuth γ of the radar is equal to the angle β. The translation of the goniometer-responder can be controlled automatically by instructed values of motion generated by the interface and control device.

A fourth step of the method consists in nullifying 15 the angle α at which the radar perceives the goniometer-responder. The nullification can be obtained by actuating the means of azimuthal adjustment of the radar to modify the azimuthal setting of the positioning of the radar. In an automatic procedure, the means for adjusting and setting the azimuthal positioning of the radar can be controlled by the interface and control device.

Figure 3:
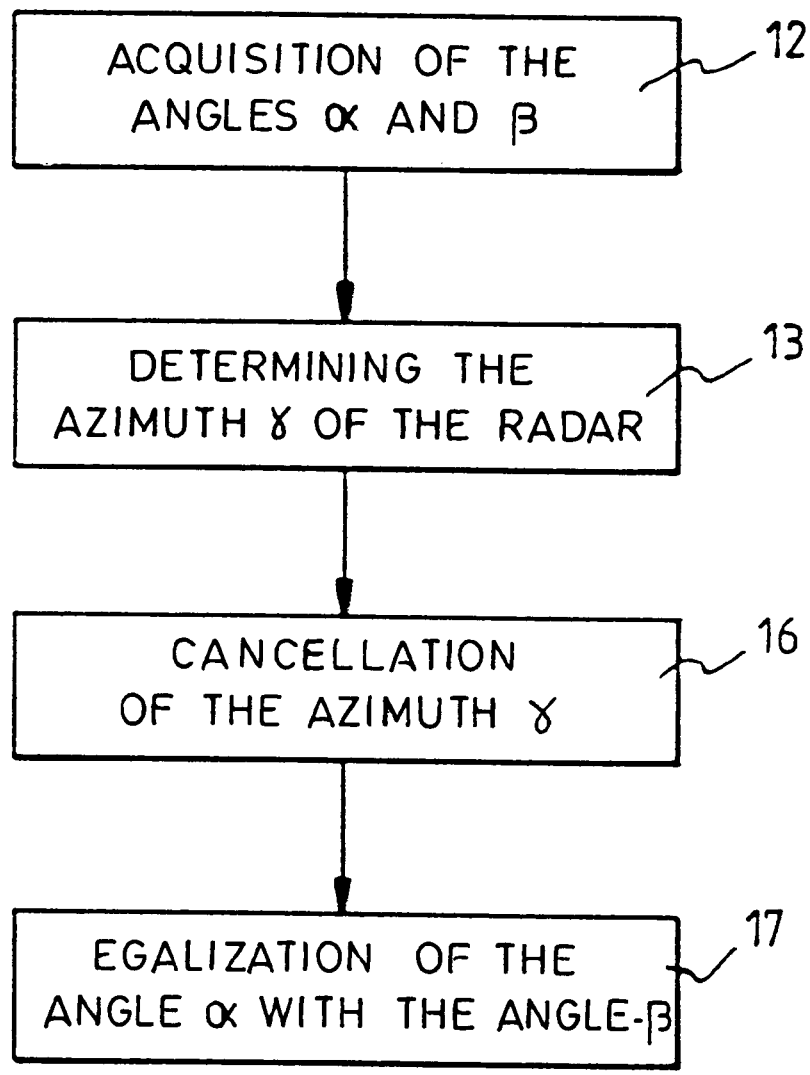
FIG. 3 shows a first alternative embodiment of the method in the form of a flow chart.

A first alternative embodiment of the method comprises four steps. This first alternative is shown in the form of a flow chart in FIG. 3.

The first acquisition step 12 and the second determining step 13 are identical to the first and second steps described with reference to FIG. 2.

In a third step, the azimuth γ is nullified 16. In one method the goniometer-responder is translated along its axis of motion until the azimuth γ is equal to zero. The translation of the goniometer-responder can be controlled automatically by instructed values of motion generated by the interface and control device.

In a fourth step, the angle α at which the radar perceives the goniometer-responder is equalized 17 with the reverse of the angle β. The equalization can be obtained by actuating the means for the azimuthal adjusting and setting of the radar to modify the azimuthal setting of the positioning of the radar. In an automatic procedure, the radar azimuthal positioning means can be controlled by the interface and control device.

Figure 4:
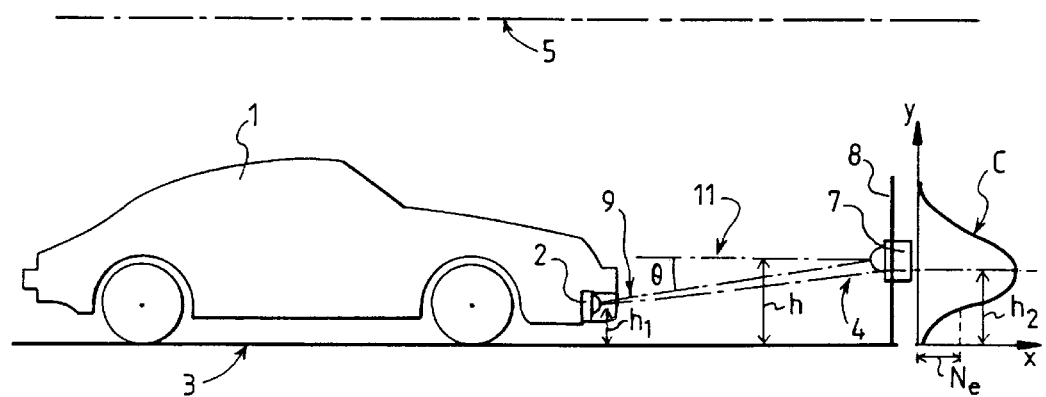
FIG. 4 shows a second alternative embodiment of the method.
Figure 5:
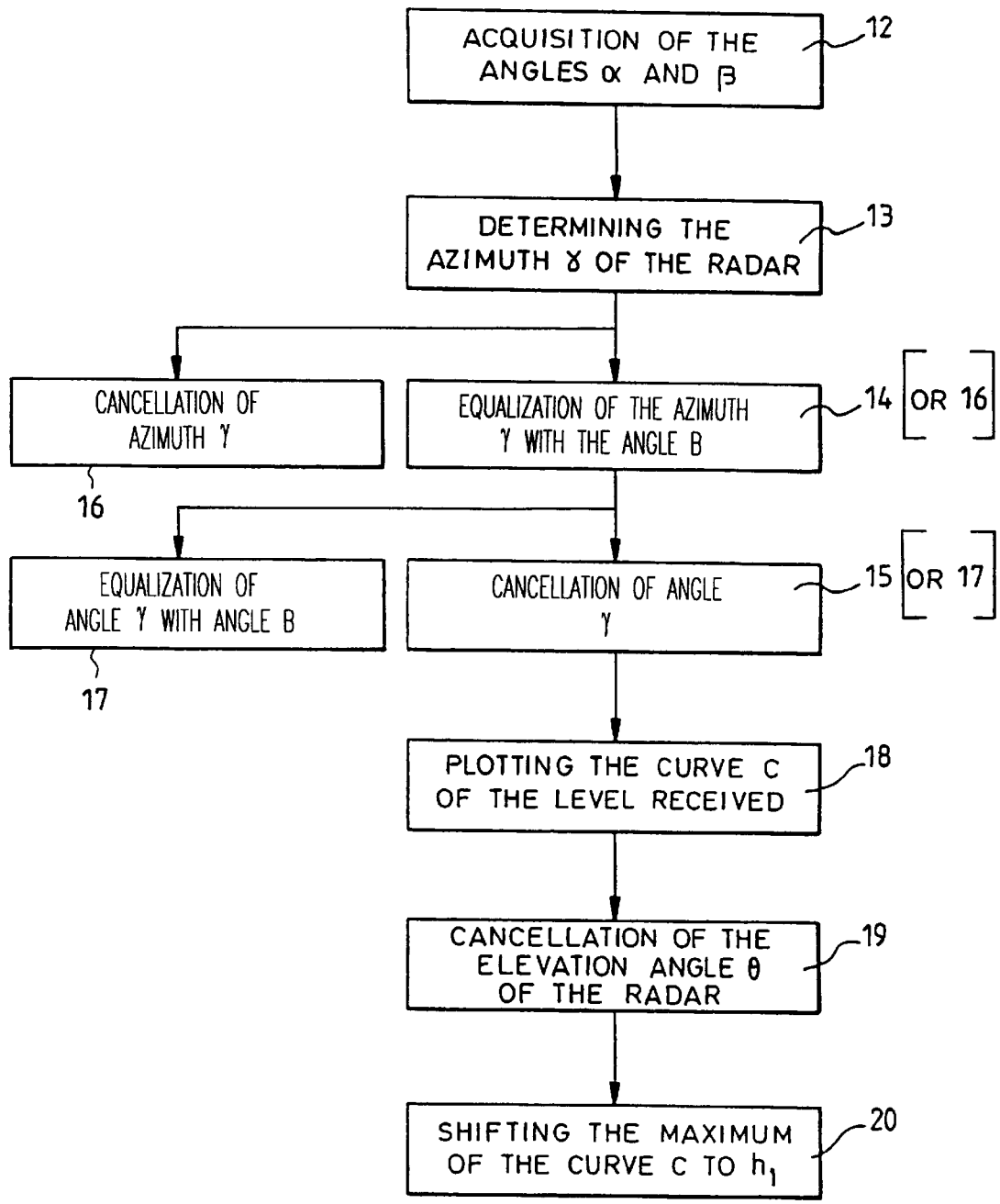
FIG. 5 shows the second alternative embodiment of the method in the form of a flow chart.

FIG. 4 illustrates a second alternative of the method according to the invention. This second alternative is represented in the form of a flow chart in FIG. 5.

According to this second alternative, the steps one to four of the method are identical to those described with reference to FIG. 2 or are identical to those of the first alternative. The method consists in carrying out a complementary adjustment in elevation of the positioning of the radar 2 to align its radio axis with the running surface used as a reference plane.

In a fifth step, the method consists in determining 18 the curve C in elevation of the level Ne received by the goniometer-responder 7 during the transmission of the radar 2 according to the position h of the goniometer-responder 7 to determine the maximum level received by the goniometer-responder 7. In one method, the antenna of the goniometer-responder 7 is rotated so that its axis of motion 8 is perpendicular to the running surface 3.

$h_1$ is the height, with respect to the running surface 3, at which the radar 2 is installed on the vehicle 1.

h is the height, compared to the running surface 3, at which the goniometer-responder 7 is positioned.

At the height h, the method consists in measuring the level Ne received by the goniometer-responder 7 during transmission by the radar 2. Then the method modifies the position h of the goniometer-responder 7 to determine the curve C in elevation of the level Ne received by the goniometer-responder 7 during transmission by the radar 2 as a function of the position h of the goniometer-responder 7. The position of the goniometer-responder 7 can be changed by translating the goniometer-responder 7 on its axis of motion 8.

The axis x of the curve C represents the level Ne received by the goniometer-responder 7 during transmission by the radar 2. The axis y of the curve C represents the position h of the goniometer-responder 7. The maximum of the curve C corresponds to a position h of the goniometer-responder 7 equal to h2. The maximum of the curve C corresponds to the barycenter of the energy received. It physically represents the radio axis 4, in elevation, of the beam of the radar 2.

A sixth step of the method consists in nullifying 19 the elevation angle θ of the radar 2 to determine the height $h_1$ at which the radar 2 is positioned on the vehicle 1. The method measures the elevation angle θ of the radar 2 by angular deflection, using the goniometer-responder 7, and translates the goniometer-responder 7 on its axis of motion 8 until the elevation angle θ is equal to zero. When the elevation angle θ is equal to 0, the goniometer-responder 7 is at a height h equal to the height $h_1$ of the radar 2; $h=h_1$.

A seventh step of the method consists in shifting 20 the maximum of the curve C to the height $h_1$. To shift the maximum of the curve the method maintains the goniometer-responder 7 at the height $h=h_1$. Then it actuates the means of adjusting the radar 2 in elevation until the level received by the goniometer-responder 7, positioned at $h_1$, is equal to the maximum of the curve C. When the received level corresponds to the maximum, then there is equality between the heights $h_2$ and $h_1$. Indeed the height $h_2$ is associated with the maximum of the curve C. The method can control the means of adjusting the positioning in elevation of the radar 2 through the interface and control device 6.

Figure 6:
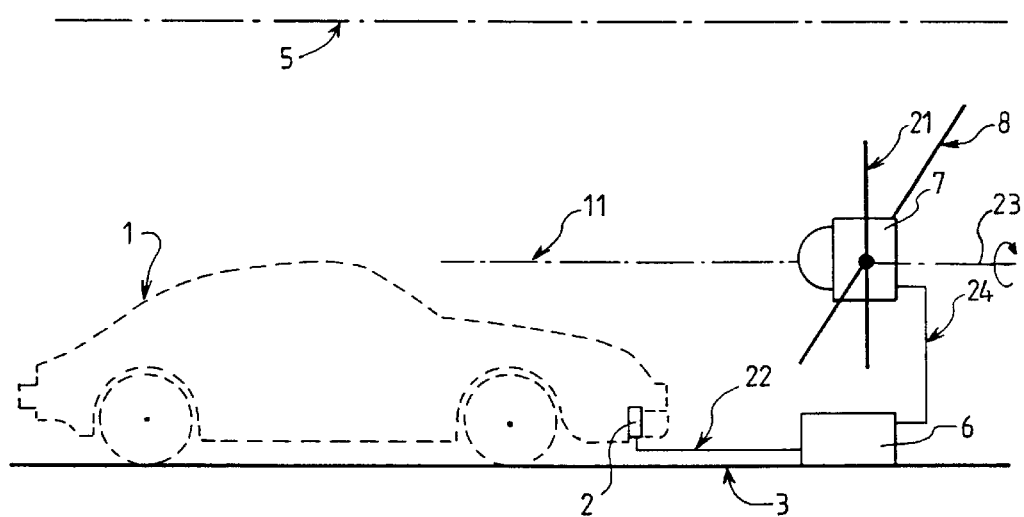
FIG. 6 shows a device according to the invention.

FIG. 6 shows a device according to the invention. The device consists of a stand to adjust and set the alignment of the radio axis of a radar installed on a vehicle. The vehicle 1 equipped with the radar 2 to be aligned is parked on a running surface 3.

The adjustment and setting stand comprises a reference axis 5, a interface and control device 6 and a goniometer-responder 7.

The interface and control device 6 and the goniometer-responder 7 may form part of the same pack.

The adjustment and setting stand is positioned in a given way with respect to the running surface 3 in order to ascertain the geometry of the unit formed by the stand and the rolling plan. The positioning is done, for example, by means of an attachment system between the stand and the running surface 3.

The goniometer-responder 7 may comprise a first axis of motion 8 and a second axis of motion 21. The first axis of motion 8 is perpendicular to the reference axis 5 and parallel to the running surface 3. The second axis of motion 21 is perpendicular to the first axis of motion 8 and to the reference axis 5. The reference axis 5 is called the axis of the stand; it is related to the running surface 3. The vehicle 4 is parked in a given way with respect to the running surface.

The interface and control device 6 is connected to the radar 2 by a preferably two-way connection 22. A two-way connection 22 allows the interface and control device 6 to send a command to configure the radar 2 in test mode and enables the interface and control device 6 to acquire the azimuth value measured by the radar 2. The connection 22 enables the interface and control device 6 to act directly on the azimuthal adjustment means and the means 2 for adjusting the radar in elevation.

The goniometer-responder 7 has a frequency band compatible with the frequency band of the radar 2. It is used for the angular localization of the radar by a measurement of angular deflection. The goniometer-responder 7 measures the angular deflection with respect to its radio axis 11. It gives a measurement of the level received during transmission by the radar 2. The goniometer-responder 7 is preferably mobile in translation on the first axis of motion 8. It can, moreover, be mobile in translation on the second axis of motion 21. The shifting of the goniometer-responder 7 on an axis of motion 8, 21 makes it possible to determine the curve of the radar level received by the goniometer-responder 7 as a function of the position of the goniometer-responder 7.

According to a particular embodiment of the stand, the device for mounting the goniometer-responder 7 furthermore has an axis of rotation 23 about which the goniometer-responder 7 can rotate. The axis of rotation is perpendicular to the first axis of motion 8 and the second axis of motion 21. When the goniometer-responder 7 is rotated about its axis of rotation 21 by an angle of π2, the 0 first axis of motion 8 becomes the second axis of motion 21. According to this embodiment, only one axis of motion is necessary.

A connection 24 between the goniometer-responder 7 and the interface and control device 6 enables the shifting of the goniometer-responder 7 to be steered by the interface and control device 6. The connection 24 is preferably a two-way connection. A first direction of this connection enables the interface and control device 6 to send a shift command. The second direction enables the goniometer-responder 7 to send, for example, its position and the radar transmission level Ne received. With the first direction, the interface and control device 6 can furthermore send a command to make the goniometer-responder 7 rotate about its axis of rotation 23.

The goniometer-responder 7 and the interface and control device 6 are described as being in separate packs. Other configurations are possible.

Figure 7:
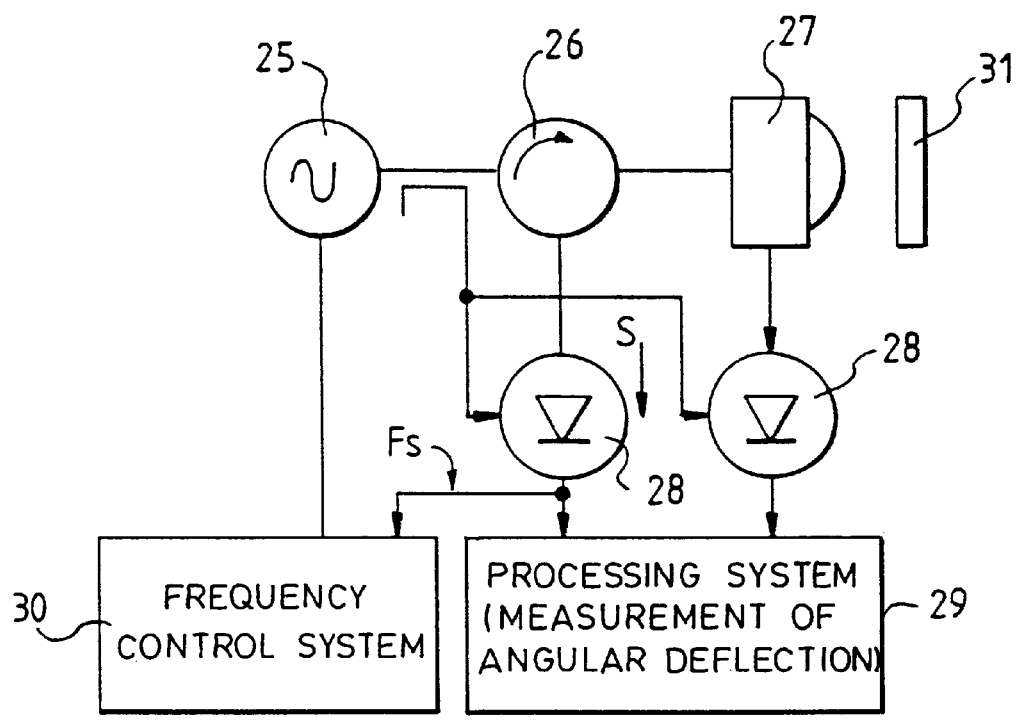

FIG. 7 gives a diagrammatic representation of a goniometer-responder of a device according to the invention. The goniometer-responder comprises a local oscillator 25, a duplexer 26, an antenna 27, reception circuits 28, a processing system 29 and a frequency control system 30. The local oscillator 25 generates a microwave whose frequency is determined by the frequency control system 30. The microwave is transmitted to the antenna 27 by means of the duplexer 26. The reception circuits 28 are used to demodulate the signals received by the antenna 27. The processing system 29 processes the demodulated signals. In particular, it determines the angle of angular deflection and measures the level transmitted by the radar and received on the antenna 27. In practice, amplification means are generally inserted in the transmission chain and the reception chain.

The local oscillator 25, the duplexer 26, the antenna 27, the reception circuits 28 and the processing system 29 may be similar to the equivalent elements of the radar installed on the vehicle.

The frequency control system 30 determines the frequency to be transmitted from the frequency information Fs of the reception circuit 28 of the sum channel S, in the case of a monopulse radar to be aligned. In the case of a multiple-beam radar to be aligned, the frequency information Fs comes from the center beam receiver. The axis of rotation of the device for mounting the goniometer-responder makes the antenna 27 rotate by 90°. The mounting device thus positions the antenna 27 appropriately so that it can take measurements of elevation and relative bearing.

When the radar to be aligned sends out a polarized signal, for example rectilinearly, the goniometer-responder furthermore comprises a polarization element 31. This polarization element 31 is either a polarization rotator or a polarizer. With the polarization element 31, the goniometer-responder can be used to take either a measurement of relative bearing or a measurement of elevation. If the radar to be aligned sends out a signal that is not rectilinearly polarized, the element of polarization 31 is not necessary.

If the goniometer-responder comprises a polarization rotator, then the rotator is removable. The polarization rotator is only installed before the antenna when the antenna is rotated by 90°. The 90° rotation of the antenna is used to take measurements of elevation. If the goniometer-responder comprises a polarizer, the polarizer can remain on the job whatever the use to which the goniometer-responder is put.

What is claimed is:

1. A method for adjusting and setting the alignment of the radio axis of a radar installed on a vehicle parked on a running surface, with respect to a determined direction relative to the vehicle, by means of an adjustment and setting stand including a goniometer-responder assembled on an axis of motion perpendicular to the axis of the stand, wherein the method comprising the steps of:

acquiring the angles $\alpha$ and $\beta$, $\alpha$ being the azimuthal angle at which the radar perceives the goniometer-responder and $\beta$ being the angle between the determined direction and the axis of the stand, determining the azimuth $\gamma$ of the radar by means of the goniometer-responder when the radar, configured in test mode, sends out a continuous frequency, equalizing the azimuth $\gamma$ with the angle $\beta$ by translating the goniometer-responder along its axis of motion, and nullifying the angle of azimuth $\alpha$ by actuating the means to adjust the radar in azimuth.

2. A method for adjusting and setting the alignment of the radio axis of a radar installed on a vehicle parked on a running surface, with respect to a determined direction relative to the vehicle, by means of an adjustment and setting stand comprising a goniometer-responder assembled on an axis of motion perpendicular to the axis of the stand, wherein the method comprising the steps of:

acquiring the angles $\alpha$ and $\beta$, $\alpha$ being the azimuthal angle at which the radar perceives the goniometer-responder and $\beta$ being the angle between the determined direction and the axis of the stand, determining the azimuth $\gamma$ of the radar by means of the goniometer-responder when the radar, configured in test mode, sends out a continuous frequency, nullifying the azimuth $\gamma$ by actuating the means for adjusting and setting the radar in azimuth, and equalizing the angle $\alpha$ with the reverse of the angle $\beta$ by translating the goniometer- responder along its axis of motion.

3. A method according to claim 1, further comprising the steps of:

determining the curve C in elevation of the level transmitted by the radar as a function of the position h of the goniometer-responder to determine the maximum level received by the goniometer-responder, nullifying the elevation angle $\theta$ of the radar to determine the height $h_1$ at which the radar is positioned on the vehicle, and shifting the maximum of the curve C to the height $h_1$.

4. A method according to claim 3, wherein the nullification of the elevation angle $\theta$ comprises the steps of:

measuring the elevation angle $\theta$ by angular deflection by means of the goniometer-responder, translating the goniometer-responder on its axis until the elevation angle $\theta$ if the radar is equal to zero, recording the height $h_1$ at which the goniometer-responder is positioned, and wherein the shifting of the maximum to the height $h_1$ includes the step of:

modifying the means of adjusting the radar in elevation until the level received on the goniometer-responder, positioned at $h_1$, is equal to the maximum of the curve C.

5. An adjustment and setting stand for adjusting and setting the alignment of the radio axis of a radar installed on a vehicle parked on a running surface, with respect to a determined direction relative to the vehicle for the implementation of the method according to claim 1, comprising:

a reference axis related to the running surface, a goniometer-responder, positioned with respect to the running surface and having a frequency band compatible with that of the radar, for the angular localization, by angular deflection, of the radar when the radar sends out a continuous frequency in a test mode, an interface and control device connected to the radar to configure the radar in test mode and acquire the azimuth $\alpha$ of the goniometer-responder measured by the radar.

6. A stand for adjusting and setting alignment of a radar installed on a vehicle with respect to a predetermined direction relative of a radio axis, the stand comprising:

a goniometer-responder assembled on an axis of motion perpendicular to the axis of the stand, wherein:

the stand is arranged to acquire the angles $\alpha$ and $\beta$, $\alpha$ being the azimuthal angle at which the radar perceives the goniometer-responder and $\beta$ being the angle between the determined direction of the axis of the stand;

the stand is arranged to determine the azimuth $\gamma$ of the radar when the radar, configured in test mode, sends out a continuous frequency;

the stand is arranged to equalize the azimuth $\gamma$ with the angle $\beta$ by translating the goniometer-responder align its axis of motion;

the stand is arranged to nullify the angle of azimuth $\alpha$ by actuating the means to adjust the radar in azimuth; and the goniometer-responder gives a measurement of the level received during the transmission by the radar and it is mobile on its axis of motion to determine the curve of the transmitted level as a function of the direction of arrival of transmission from the radar.

7. A stand according to claim 6, wherein:

the goniometer-responder comprises a removable polarization rotator.

8. A stand according to claim 6, wherein:

the goniometer-responder comprises a polarizer.

9. A stand according to claim 5, wherein the goniometer-responder comprises:

a local oscillator to generate a microwave and a duplexer to transmit the microwave generated by the local oscillator, an antenna to send the microwave transmitted by the duplexer and receive the microwaves and reception circuits to demodulate the signals received by the antenna, a processing system to treat the demodulated signals and, a frequency control system to determine the frequency of the microwave generated by the local oscillator.

10. A stand according to claim 5, comprising:

a stand to measure the position of the wheels of the vehicle to determine the direction of the thrust axis of the vehicle, the determined direction coinciding with the thrust axis.

* * * * *